United States Patent
Lester et al.

(10) Patent No.: US 10,554,027 B2
(45) Date of Patent: Feb. 4, 2020

(54) PROTECTIVE COVER FOR CABLE COMPONENTS

(71) Applicants: Michael E. Lester, Burton, OH (US); Michael John Williams, Landrum, SC (US); Matthew John Williams, Chagrin Falls, OH (US)

(72) Inventors: Michael E. Lester, Burton, OH (US); Michael John Williams, Landrum, SC (US); Matthew John Williams, Chagrin Falls, OH (US)

(73) Assignee: Electrolock, Inc., Spartanburg, SC (US)

(*) Notice: Subject to any disclaimer, the term of this patent is extended or adjusted under 35 U.S.C. 154(b) by 142 days.

(21) Appl. No.: 15/498,611

(22) Filed: Apr. 27, 2017

(65) Prior Publication Data

US 2018/0233889 A1  Aug. 16, 2018

Related U.S. Application Data

(63) Continuation-in-part of application No. 15/014,754, filed on Feb. 3, 2016, now Pat. No. 9,716,375.

(51) Int. Cl.
  *B23P 19/00* (2006.01)
  *H02G 3/04* (2006.01)
  *H01B 7/29* (2006.01)

(52) U.S. Cl.
  CPC .......... *H02G 3/0418* (2013.01); *H01B 7/29* (2013.01); *H02G 3/0412* (2013.01); *H02G 3/0481* (2013.01); *Y10T 29/49194* (2015.01); *Y10T 29/5313* (2015.01)

(58) Field of Classification Search
  CPC . B32B 1/08; B32B 2597/00; B32B 2260/021; Y10T 29/49826; Y10T 29/49194; Y10T 29/49199; Y10T 29/5313; Y10T 403/725; F16L 57/00

USPC ......... 29/729, 871, 423, 447, 458, 515, 717, 29/718, 868

See application file for complete search history.

(56) References Cited

U.S. PATENT DOCUMENTS

| 290,831 | A | 12/1883 | Allen |
| 2,012,108 | A | 8/1935 | Raney |
| 2,783,173 | A | 2/1957 | Walker et al. |

(Continued)

FOREIGN PATENT DOCUMENTS

WO   0210633 A1   2/2002

OTHER PUBLICATIONS

International Search Report and Written Opinion dated Sep. 18, 2018 in counterpart International Application Serial No. PCT/US2018/029789.

*Primary Examiner* — Thiem D Phan
(74) *Attorney, Agent, or Firm* — Fox Rothschild LLP

(57) ABSTRACT

A protective cover for cable connectors and methods of fabricated the protective cover. The protective cover comprises a tube open at one end and substantially closed at the opposed end by an end cap. The end cap bears at least one opening formed therein. The protective cover has a foil outer layer, a soft felt inner layer, and an insulating fiberglass core between the outer and inner layers. The tube is made by overlappingly rolling and bonding a section of foil-backed fiberglass. The end cap may be separately made, made as part of the pattern for the tube, or may be formed by cutting pointed teeth into one end of the tube pattern and bonding them generally perpendicularly to the length of the tube.

8 Claims, 13 Drawing Sheets

(56) References Cited

U.S. PATENT DOCUMENTS

| | | |
|---|---|---|
| 2,858,854 A | 11/1958 | Daggett |
| 3,167,374 A | 1/1965 | Healy |
| 3,434,502 A | 3/1969 | Snelling |
| 3,524,779 A | 8/1970 | Masters et al. |
| 3,980,107 A | 9/1976 | Barnes |
| 4,417,603 A | 11/1983 | Argy |
| 4,472,222 A * | 9/1984 | Moisson ............ G02B 6/4476 156/49 |
| 5,053,582 A | 10/1991 | Terakawa et al. |
| 5,190,810 A | 3/1993 | Kirschbaum et al. |
| 5,603,358 A | 2/1997 | Lepoutre |
| 5,718,956 A | 2/1998 | Gladfelter et al. |
| 6,244,756 B1 | 6/2001 | Bloom |
| 7,186,038 B2 | 3/2007 | Hovland |
| 7,331,504 B2 | 2/2008 | Languillat et al. |
| 7,410,550 B2 | 8/2008 | Sherwin |
| 7,624,762 B2 | 12/2009 | Cohen et al. |
| 9,157,564 B2 | 10/2015 | Sellis et al. |
| 9,876,339 B2 * | 1/2018 | Teal .................. G01N 27/4078 |
| 2003/0198806 A1 | 10/2003 | Samson-Himmelstjerna et al. |
| 2004/0185205 A1 | 9/2004 | van de Camp |
| 2005/0129884 A1 | 6/2005 | Jones |
| 2005/0260365 A1 | 11/2005 | Niu et al. |
| 2006/0141179 A1 | 6/2006 | van de Camp |
| 2007/0173156 A1 | 7/2007 | Kulper et al. |
| 2008/0286568 A1 | 11/2008 | Kopf et al. |
| 2009/0098324 A1 | 4/2009 | Hasegawa et al. |
| 2010/0236827 A1 | 9/2010 | Doi et al. |
| 2014/0038470 A1 | 2/2014 | Aune, Jr. |
| 2017/0012417 A1 | 1/2017 | Teal |

* cited by examiner

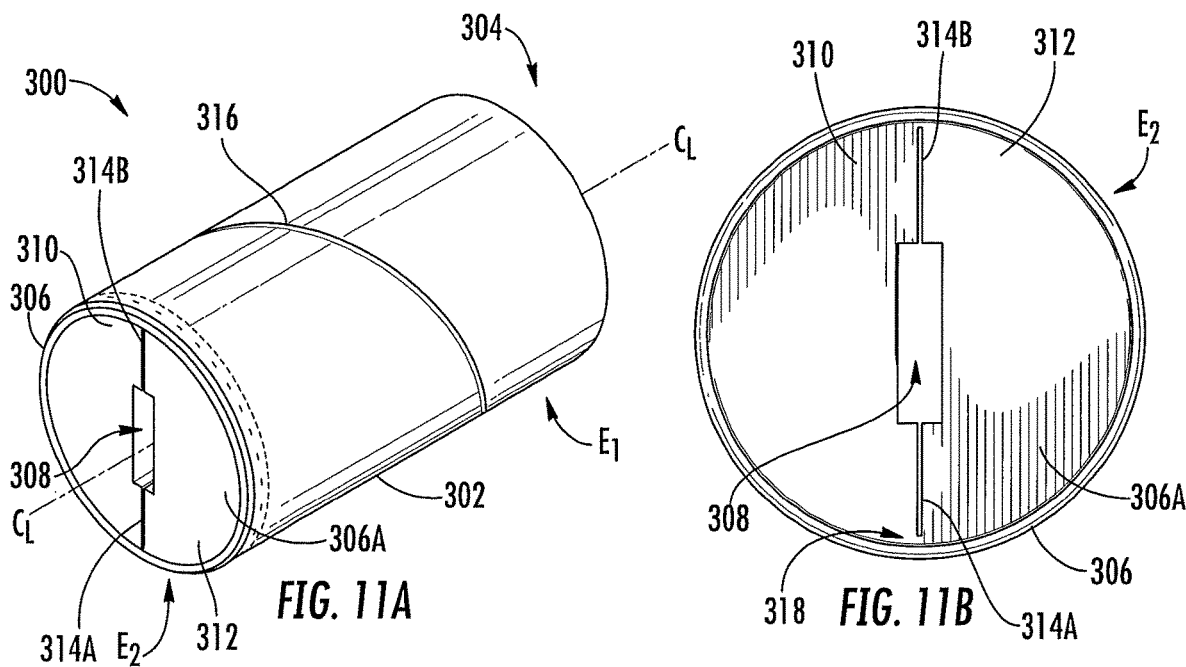
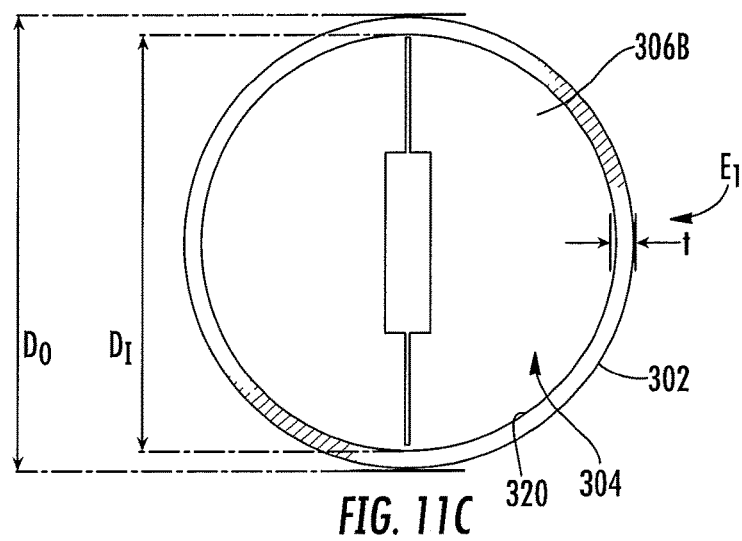
FIG. 11A
FIG. 11B
FIG. 11C

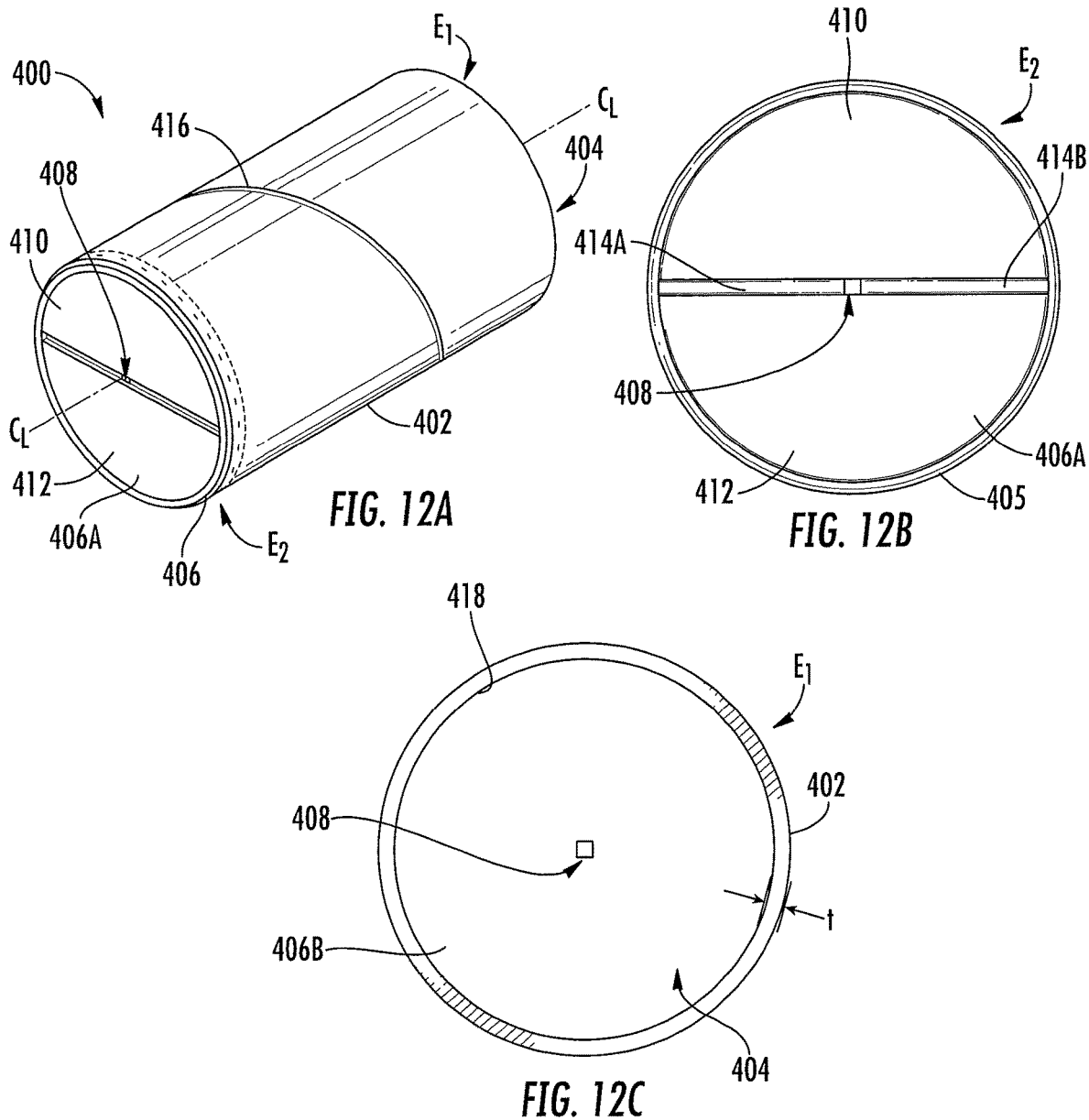

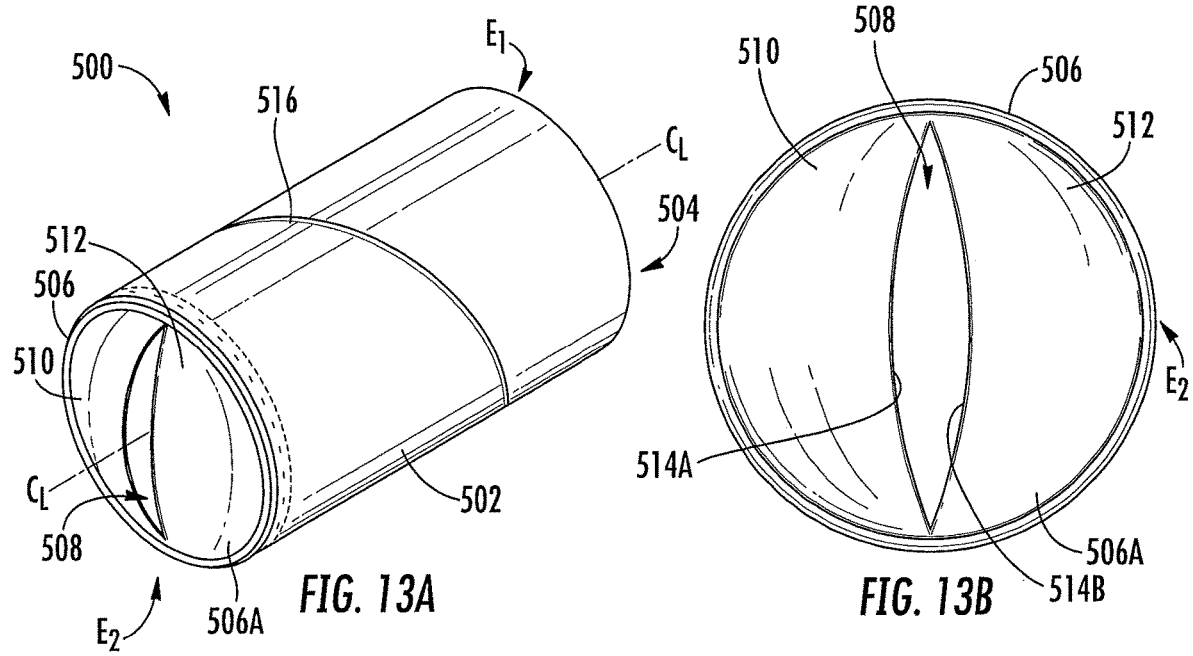
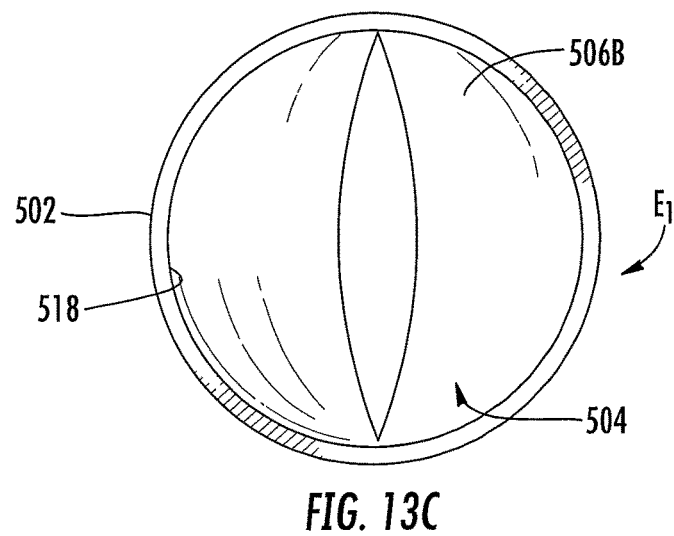

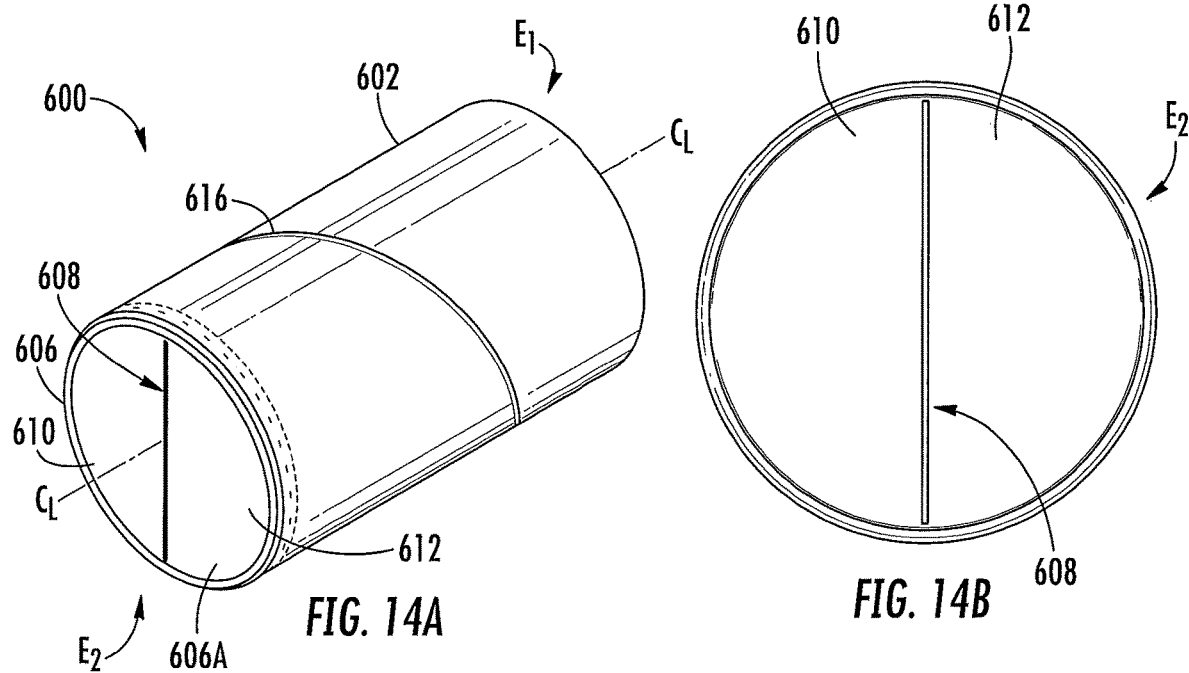
FIG. 14A
FIG. 14B
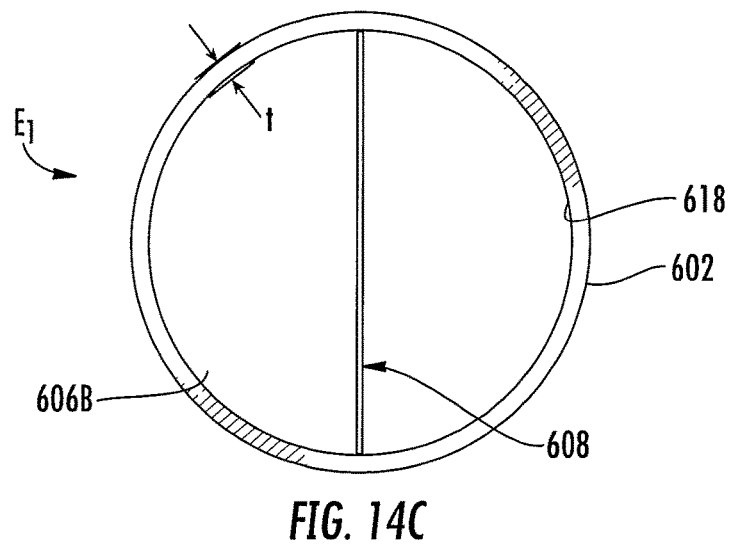
FIG. 14C

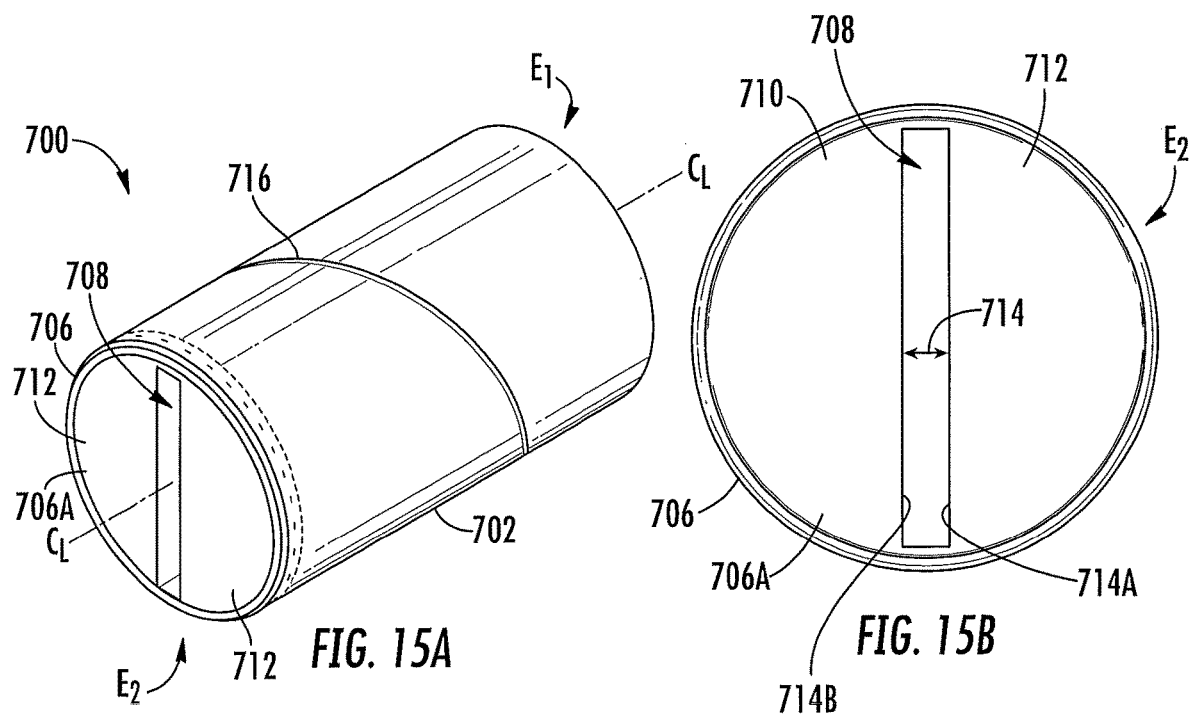
FIG. 15A
FIG. 15B
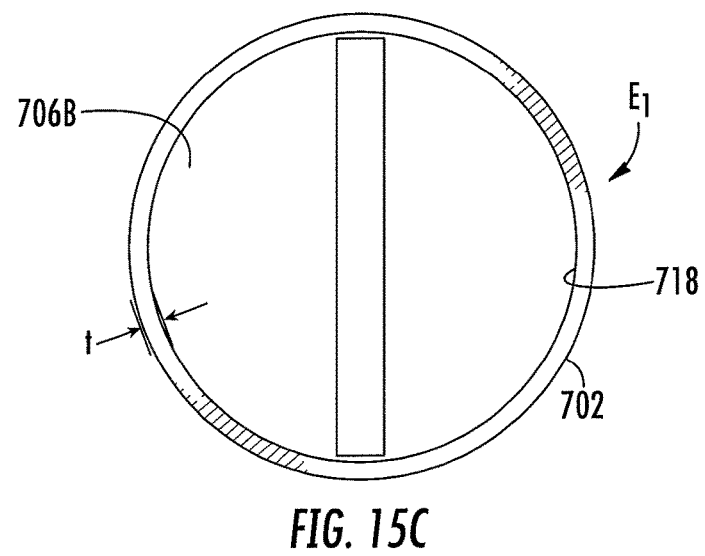
FIG. 15C

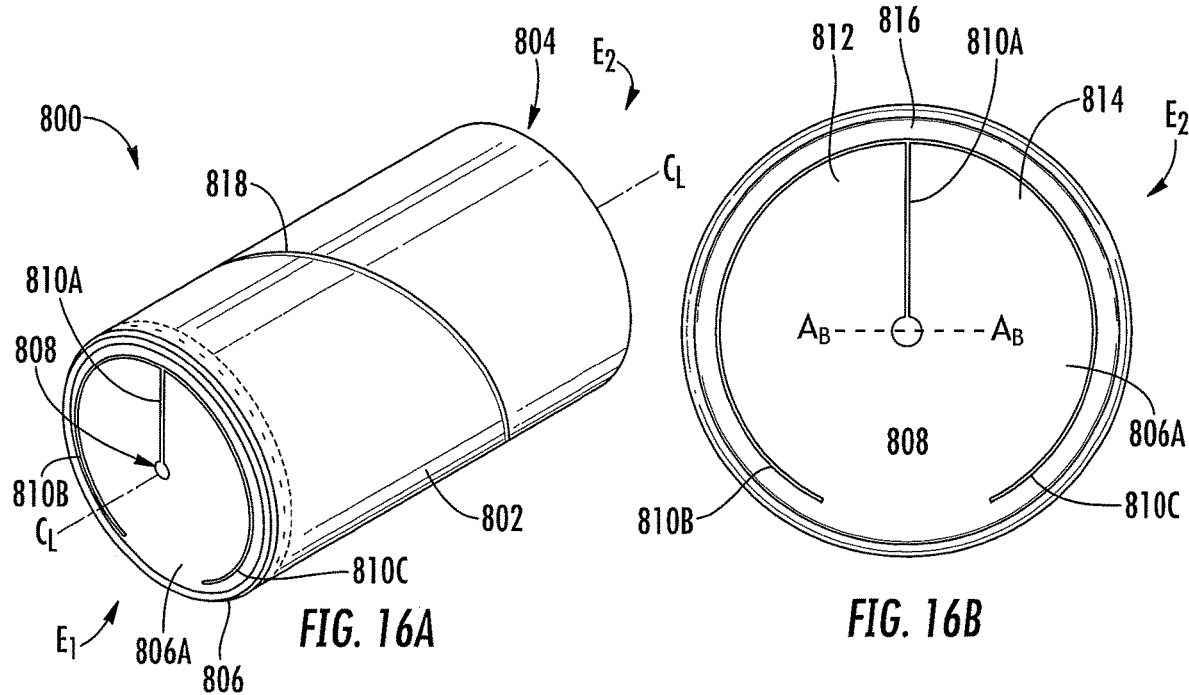
FIG. 16A
FIG. 16B
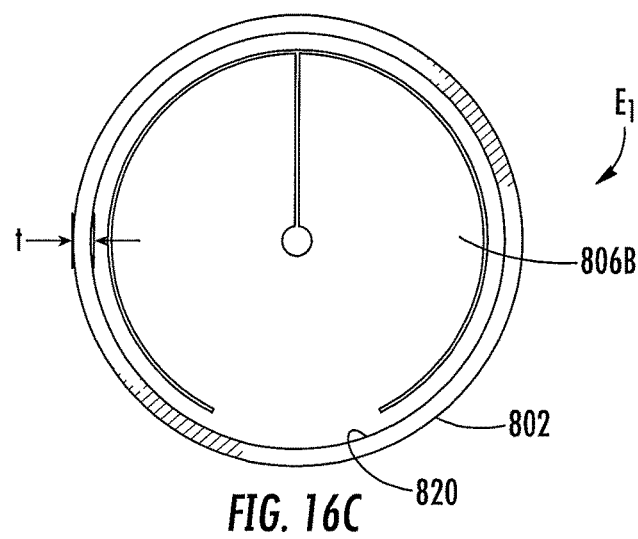
FIG. 16C

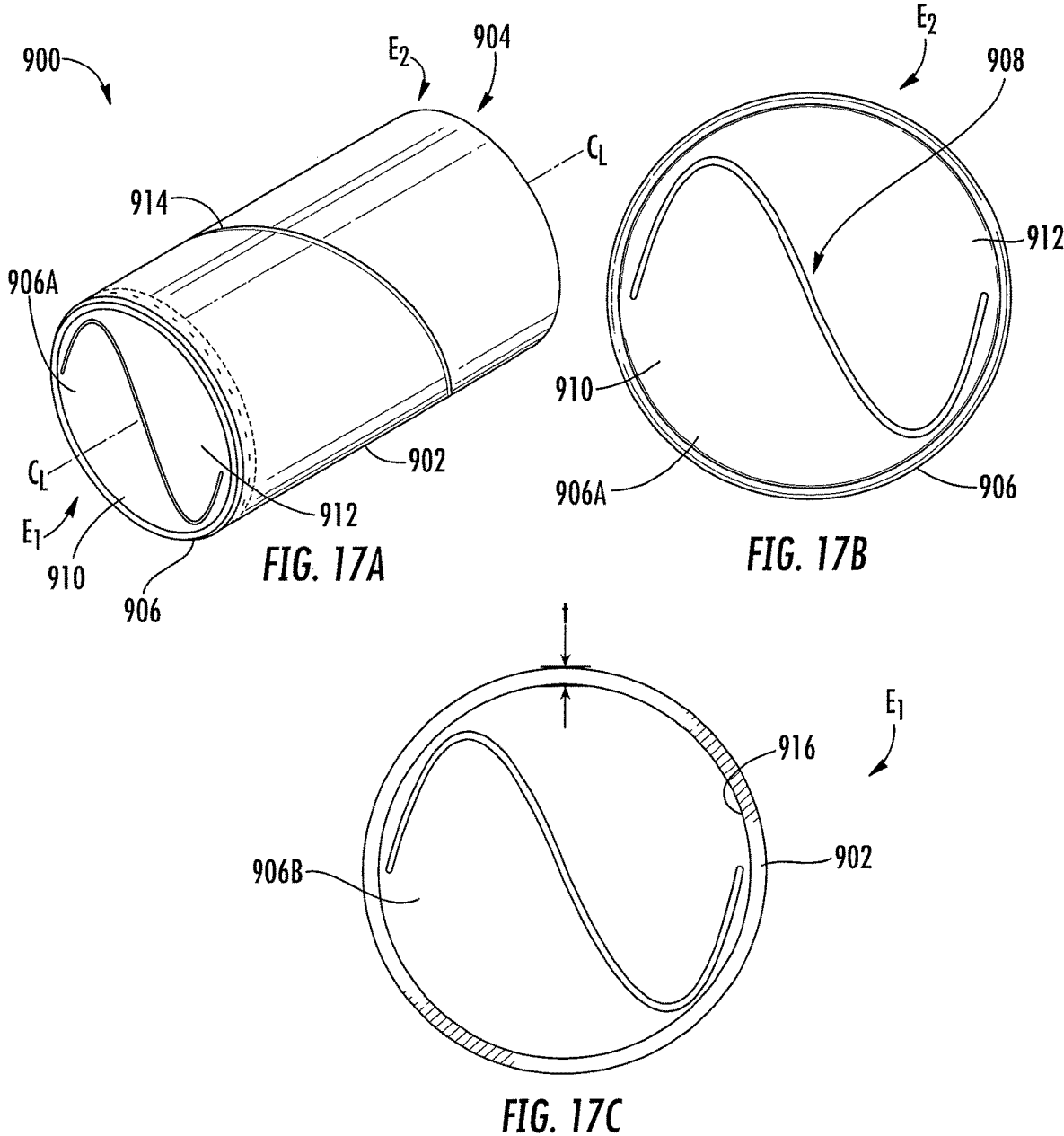

PROTECTIVE COVER FOR CABLE COMPONENTS

CROSS-REFERENCE TO RELATED APPLICATION

This application claims the benefit of and is a continuation-in-part from U.S. patent application Ser. No. 15/014,754, filed on Feb. 3, 2016, the content of which is hereby incorporated herein in the entirety.

FIELD OF THE DISCLOSURE

The present disclosure relates to a protective cover for connectors, sensors, and other components used with electrical cables and the like.

BACKGROUND

In certain applications, it may be desirable to protect connectors, sensors, and other components for electrical cables, hoses, tubing, piping, tension cabling, etc., from heat and abrasion, and perhaps to a lesser extent from vibration, particularly in environments where elevated temperatures and/or vibration are present, such as may be in the case of engine or motor compartments in vehicles and/or in other industrial, commercial, aerospace, and/or marine applications.

Therefore, it may be desirable to have devices and methods that take into account the issues discussed above, as well as possibly other issues.

SUMMARY

The following is a non-exhaustive list of examples, which may or may not be claimed, of the subject matter according the present disclosure.

According to example implementations of the present disclosure, concepts are set forth regarding protective cover, which could serve a temperature insulating cover, for cables and associated connectors, sensors and components, and methods of fabricating the protective cover. In certain implementations, the protective cover comprises a tube open at one end and substantially closed at the opposed end by an end cap, and the end cap includes an opening formed therein. The opening may be formed by slits, or by a combination of a permanently open hole in addition to slits. The end cap has a foil outer layer, a soft felt inner layer, and an insulating core, which could be fiberglass or some other suitable material, between the outer and inner layers. The opening in the end cap is adapted to receive one or more electric or optical cables, fluid hoses, tubing, tension cables, or the like. The tube is of greater diameter than the opening and is intended to slide over an electrical connector, sensor, fluid valve, or other component.

In one example implementation, the protective cover according to at least one aspect of the disclosure is applied to electrical conductors and associated connectors and/or sensors in the motor and/or engine compartment of motor vehicles.

According to other example implementations of the present disclosure, methods of fabricating a protective cover from pre-fabricated foil-backed fiberglass (or other suitable material) are set forth. In one such implementation, the foil-backed fiberglass is cut to a desired size, lined with felt, and rolled or wound into a tube with approximately ten to forty percent overlap, and bonded. An end cap is then applied and bonded in place. The end cap, also lined with felt, may be made as a component hinged to the pattern of initial foil-backed fiberglass, or may be made separately from that used to form the tube.

In a further method implementation, a pattern for the tube may be cut to include pointed portions, or teeth, which are folded to close the tube. Bonding the teeth together along part of their length enables the unbonded portions to be pushed aside as a cable is passed therethrough, thereby allowing the unbonded portions to tend to close over the cable, thereby generally closing one end of the tube.

The features, functions and advantages discussed herein may be achieved independently in various example implementations or may be combined in yet other example implementations, further details of which may be seen with reference to the following description and drawings.

BRIEF DESCRIPTION OF THE DRAWINGS

Various objects, features, and attendant advantages of the disclosed concepts will become more fully appreciated as the same becomes better understood when considered in conjunction with the accompanying drawings, which are not necessarily drawn to scale, in which like reference characters designate the same or similar parts throughout the several views, and wherein:

FIGS. 11A-11C are respective perspective, front plan, and rear plan detail views of a protective cover, according to yet another example of the disclosure;

FIGS. 12A-12C are respective perspective, front plan, and rear plan detail views of a protective cover, according to yet another example of the disclosure;

FIGS. 13A-13C are respective perspective, front plan, and rear plan detail views of a protective cover, according to yet another example of the disclosure;

FIGS. 14A-14C are respective perspective, front plan, and rear plan detail views of a protective cover, according to yet another example of the disclosure;

FIGS. 15A-15C are respective perspective, front plan, and rear plan detail views of a protective cover, according to yet another example of the disclosure;

FIGS. 16A-16C are respective perspective, front plan, and rear plan detail views of a protective cover, according to yet another example of the disclosure;

FIGS. 17A-17C are respective perspective, front plan, and rear plan detail views of a protective cover, according to yet another example of the disclosure.

Figure 1:
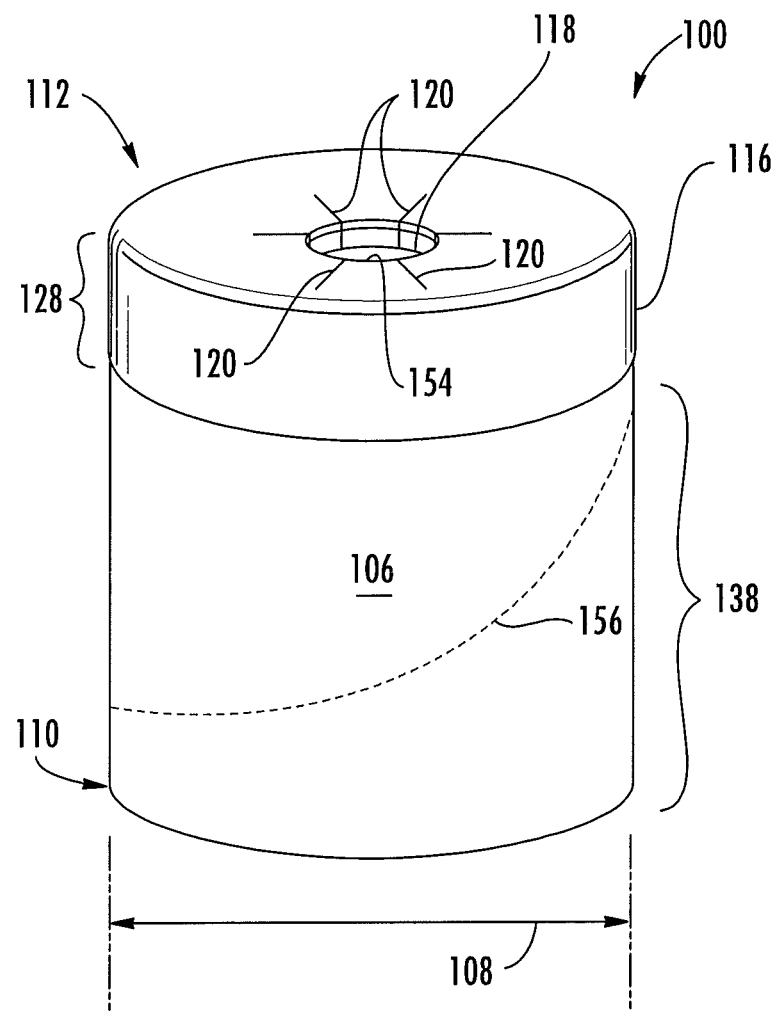
FIG. 1 is a perspective view of a protective cover for cable components according to at least one aspect of the disclosure.

Each figure shown in this disclosure shows a variation of an aspect of the embodiments presented, and only differences will be discussed in detail.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Like reference numerals refer to like elements throughout.

Example implementations of the present disclosure are generally directed to a material tensioning system. Example implementations of the present disclosure may find use in a variety of industries, including, without limitation, the automotive, aerospace, marine, commercial, construction, medical, and other industry sectors.

An example implementation of a protective cover, or "cover," generally 100, for electrical cables, optical cables, hoses, tubing, piping, tension cables, etc., and with which methods as disclosed herein may be produced, is shown in detail in the attached figures.

Figure 2:
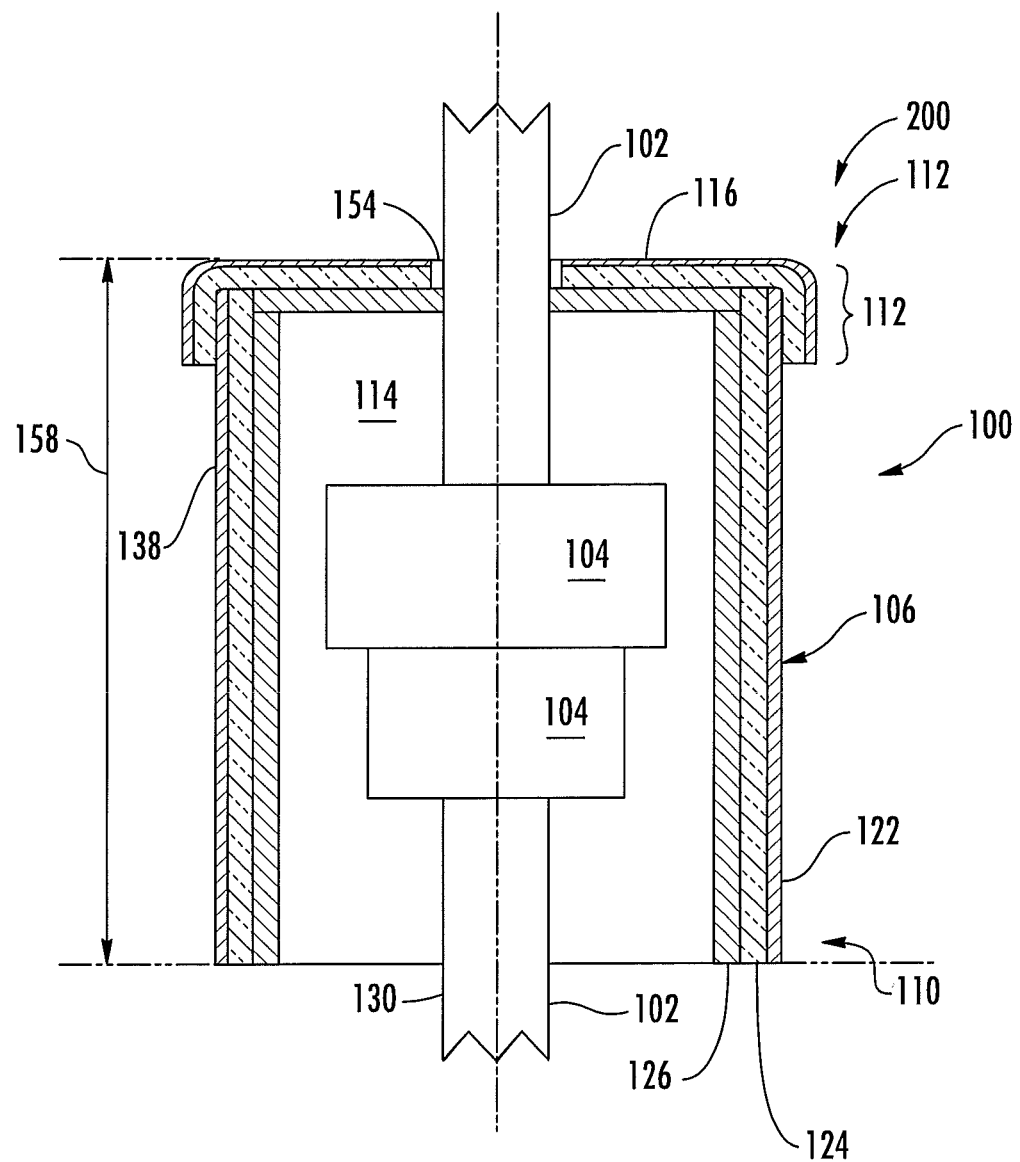
FIG. 2 is a side cross sectional view of a protective cover, according to at least one further example of the disclosure.

Referring first to FIGS. 1 and 2, according to at least one aspect of the disclosure, there is shown a protective cover 100 for protecting cable 102 and associated connectors, sensors, or other components, generally 104. Protective cover 100 comprises a tubular portion, or wall, or "tubular wall," 106 surrounding, or defining, an internal volume 114, tubular wall 106 having an outer diameter 108, a proximal end 110, and a distal end 112, and entirely covering, or substantially covering, outer bounds of internal volume 114 between open proximal end 110 and partially-closed distal end 112. It is to be understood that while tubular wall 106 is in one implementation generally cylindrical in shape, having a circular cross-section, it is not limited to such cylindrical shape and could be a variety of other shapes and/or cross-sections if desired. A cover, or cap member 116 covers distal end 112 of tubular wall 106. Cap member 116 has a central opening 118 and slits 120 radiating outwardly from central opening 128. Tubular wall 106 and cap member 116 each comprise an outer metallic foil 122, a central flexible insulating material 124, and an inner soft lining material 126 (which may be non-marring to cable 102 jacketing or insulation upon contact with cable 102 and/or such jacketing or insulation) facing internal volume 114.

Flexible insulating material 124 may primarily comprise a suitable insulation material, such as fiberglass, in one implementation. In an example implementation, a 0.001 inch thick aluminum with a 2.8 ounce glass cloth bonded to one side could be satisfactory as a flexible insulating material 124. In one implementation, outer metallic foil 122 may primarily comprise aluminum. In one implementation, inner soft lining 126 may primarily comprise polyester felt. In one implementation, a nonwoven polyester felt could be used as a non-marring, inner soft lining material 126.

In one implementation of protective cover 100, cap member 116 has a diameter greater than outer diameter 118 of tubular wall 106. That portion of cap member 116 projecting beyond outer diameter 108 of tubular wall 106 when cap member 116 is placed against and centered over distal end 112 of tubular outer wall 106 comprises a folded portion 128 folded against and bonded to the outer surface of tubular outer wall 106. Cap member 116 has a diameter greater than outer diameter 118 only prior to folding the folded portion 128 against the outer surface of tubular wall 106. After folding, cap member 116 has a nominal diameter just greater than outer diameter 108, due to the contribution to overall thickness of folded portion 128. Bonding may be performed in any suitable way, such as by adhesives and/or heat welding, etc.

In one implementation of protective cover 100, tubular wall 106 is nominally generally cylindrical, particularly when not acted on by external forces, and has a central longitudinal axis 130 parallel to tubular wall 106. Cap member 116 is generally circular and substantially extends in a plane is generally perpendicular to central longitudinal axis 130. The cylindrical configuration of protective cover 100 may be configured to cooperate with commercially-produced connectors and/or sensors, etc., which in some cases may be of generally circular cross section, when taken at most points along the direction of conduction of current.

According to a further implementation of the disclosure, and referring particularly to FIG. 2, there is shown a cable component and protective cover assembly 200, comprising cable 102 (which could be an electrical and/or optical cable), a component 104 terminating cable 102, and protective cover 100 comprising tubular wall 106 surrounding internal volume 114. Tubular wall 106 has outer diameter 108, proximal end 110, and distal end 112. Tubular wall 106 entirely covers the outer bounds of internal volume 114 between open proximal end 110 and partially closed distal end 112. Protective cover 100 further comprises cap member 116 located at and covering distal end 112 of tubular outer wall 106. Cap member 116 has central opening 118 and slits 120 radiating outwardly from central opening 118. Tubular wall 106 and cap member 116 each comprise outer metallic foil 122, central flexible insulating material 124, and inner soft lining 126 facing internal volume 114. Tubular wall 106 of protective cover 100 is dimensioned and configured to receive electrical component 104 in close cooperation therewith. Cable 102 passes through central opening 118 of cap member 116. Cable component and protective cover assembly 100 may be thought of as a thermally protected electrical connection including either one of the two mating electrical components 104, such as connectors, and its associated cable 102, or alternatively, both of the two mating electrical components 104, such as electrical connectors, and both associated cables 102, in addition to protective cover 100. In motor vehicle engine/motor compartment applications, protective cover 100 may be used to shield connectors 104 from relatively high temperatures and/or vibrations.

Figure 3:
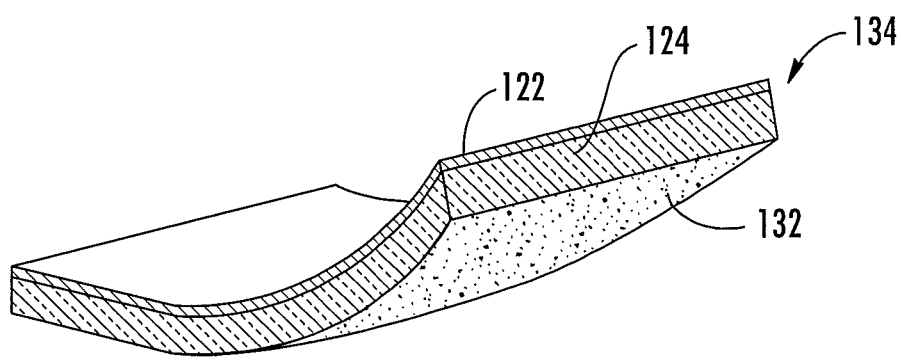
FIG. 3 is a perspective detail view of material used to fabricate the protective covers of FIGS. 1 and 2, according to at least one additional example of the disclosure.
Figure 4:
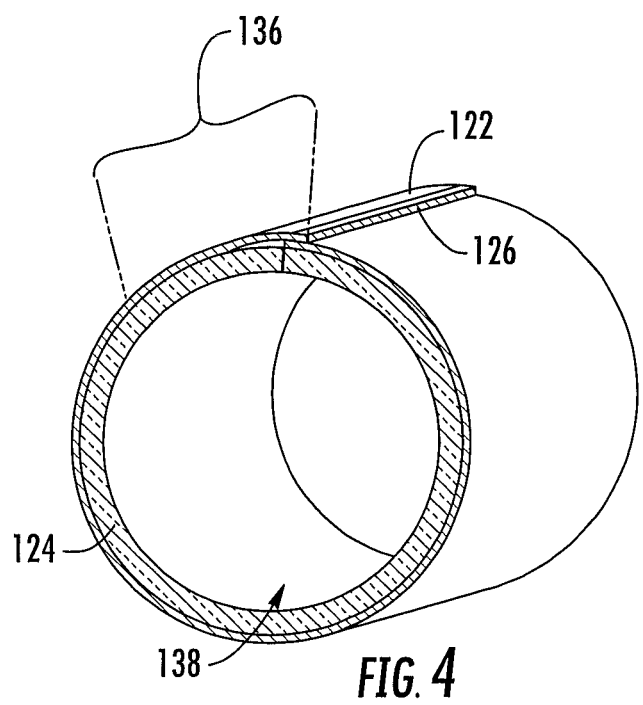
FIG. 4 is a perspective detail view showing a progressive stage in forming a protective cover from the material of FIG. 3.

According to still a further aspect of the disclosure, and referring additionally to FIGS. 3 and 4, there is shown a method of fabricating, for example from a prefabricated section of foil-backed fiberglass substrate (not shown), protective cover 100 for protecting jacketed cables 102 and associated connectors 104, wherein protective cover 100 has a final, or fabricated, configuration including a final, or fabricated, surface area, a final, or fabricated, length 158 (FIG. 2), a final, or fabricated, diameter, and central longitudinal axis 130 (FIG. 2). The method comprises laminating a prefabricated section of foil-backed fiberglass substrate to an adhesive 132, and cutting a patch, or template, or, pattern, 134 from the section of the foil-backed fiberglass substrate, pattern 134 having area slightly greater than the final surface area.

In one implementation, the method may further comprise forming pattern 134 into a tube 138 corresponding to the final diameter, and adhering a lapping portion 136 of the outer metallic foil 122 of the foil-backed fiberglass substrate to tube 138 in the final configuration. The method further comprises forming the section of the foil-backed fiberglass substrate into an end section 140, cutting central opening 118 into end section 140, placing end section 140 over an end (e.g., that end which becomes distal end 112) of tube 138, and bonding end section 140 to tube 138 to form the final configuration. Bonding may be performed in any suitable way, such as by heat welding and/or through use of adhesive. It should be noted that the final configuration, the final surface area, the final length, the final diameter, and central longitudinal axis 130 all refer to protective cover 100 in its finished state. The final configuration is, in the examples of FIGS. 1 and 2, that of a cylindrical tube, although it is to be understood that cover 100 could be of different shapes if desired and (although not shown) could include cross-sectional shapes such as a rectangle, oval, trapezoid, star, irregular shape, etc. and/or a shape form fitted to a component 104.

The prefabricated section of foil-backed fiberglass substrate refers to the prefabricated foil-backed fiberglass substrate product as it is provided by the supplier. This product is typically furnished in sheets and/or rolls of dimensions considerably greater than pattern 134. Pattern 134 is greater in one dimension than that of the finished tubular portion of protective cover 100 to allow for lapping portion 136, the latter used to seal the rolled formerly rectangular pattern 134 into tube 138 by adhesive 132. In one implementation, a high temperature acrylic adhesive could be used as adhesive 132.

In a further example of the method, forming pattern 134 into tube 138 corresponding to the final length and the final diameter comprises lining pattern 134 on an interior surface thereof with non-abrasive, inner lining 126, and not lining pattern 134 with inner lining 126 at lapping portion 136, thereby leaving adhesive 132 exposed for subsequent joining of lapping portion 136 to tube 138.

Adhesive 132 is shown in FIG. 3, but is omitted from view in FIG. 4 for visual clarity. Adhesive 132 is present in rolled tube 138 shown in FIG. 4, serving to adhere lapping portion 136 to tube 138.

It should further be noted that end section 140 is selected as a term that encompasses but is more generic than, cap member 116. Cap member 116 may be made from prefabricated foil-backed fiberglass substrate, with inner, non-abrasive, lining 126 bonded thereto, as a member separate from tube 138, or alternatively, as a single member which is part of the original section of prefabricated foil-backed fiberglass substrate with inner lining 126, wherein the single member comprises cap member 116 integral with tube 138. Bonding of inner lining 126 is accomplished by adhesive 132.

Figure 5:
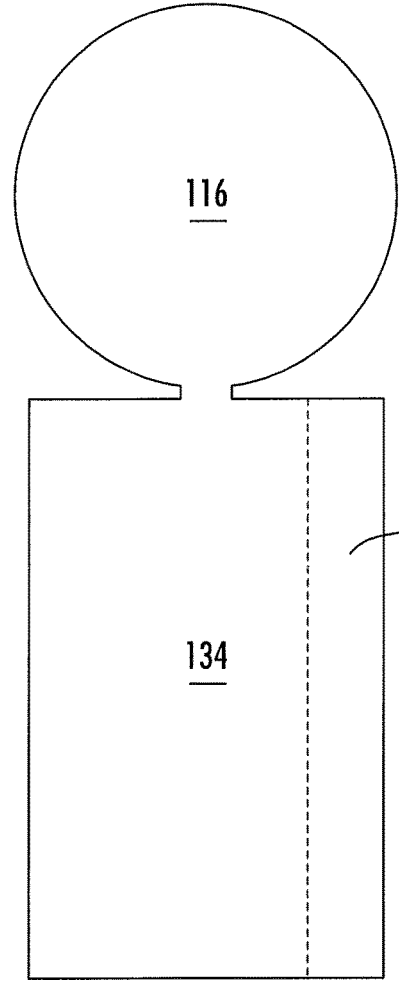
FIG. 5 is a plan view of a template or pattern for cutting material to fabricate a protective cover, according to still another example of the disclosure.

The first two examples are depicted in FIGS. 1-4. The latter situation is depicted in FIG. 5, which shows a pattern for the material (referring to both the prefabricated foil-backed fiberglass substrate, and also to inner lining 126) which will become cap member 116 and tube 138. However, as will be discussed hereinafter, end section 140 may be provided in still additional ways.

In another example of the method, forming pattern 134 into tube 138 corresponding to the final diameter, and adhering lapping portion 136 of the foil-backed fiberglass substrate to tube 138 in the final configuration further comprises forming pattern 134 into tube 138 by helically winding pattern 134. As seen in FIG. 1, a visible seam 156 oriented at an acute angle to longitudinal central axis 130 of protective cover 100 results from helically winding pattern 134.

In an example of the method, laminating the prefabricated section of the foil-backed fiberglass substrate to adhesive 132 comprises laminating the foil-backed fiberglass substrate to a pressure sensitive adhesive 132, and bonding end section 140 to tube 138 comprises pressing an overhang portion of end section 140 against tube 138.

Figure 6:
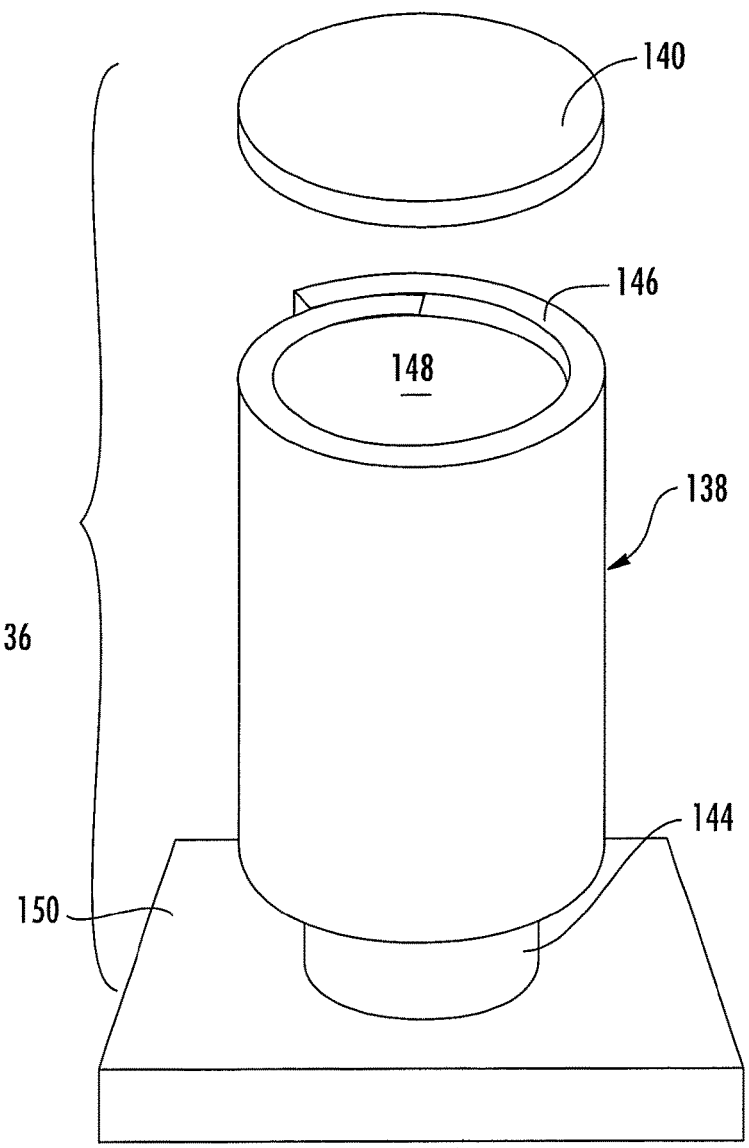
FIG. 6 is an exploded perspective view illustrating an aspect of fabricating a protective cover, according to yet another example of the disclosure.

Referring additionally to FIG. 6, in an example of the method, placing end section 140 over the end (e.g., that end which will become distal end 112 of protective cover 100) of tube 139 comprises supporting tube 138 on a close fitting cylindrical form 144 inside tube 138. In FIG. 6, an upper surface 146 of tube 138 and an upper surface 148 of form 144 are coplanar, to promote effective positioning of end section 140. Form 144 is depicted as being secured to a tabletop 150 or other sturdy object.

It should be noted at this point that orientational terms such as upper refer to the subject drawing as viewed by an observer. The drawing figures depict their subject matter in arbitrarily selected orientations of use, which could obviously change depending on how the depicted objects are supported or held. Therefore, orientational terms must be understood to provide semantic basis for purposes of description only, and do not imply that their subject matter can be used only in one position.

Turning again to FIGS. 1 and 2, in an example of the method, forming the section of the foil-backed fiberglass substrate into end section 140 comprises forming end section 140 to have a diameter slightly greater than a final diameter of protective cover 100, folding an overhang portion (folded portion 128, prior to folding) of end section 140 over an exterior of tube 138, and bonding the overhang portion of end section 140 to the exterior of tube 138. In a further example of the method, bonding the overhang portion of end section 140 to tube 138 comprises heat welding end section 140 to tube 138.

In another example of the method, cutting pattern 134 from the section of the foil-backed fiberglass substrate comprises cutting pattern 134 to have a dimension such that winding the section into tube 138 produces between ten percent and forty percent overlap along a circumference of tube 138.

Figure 7:
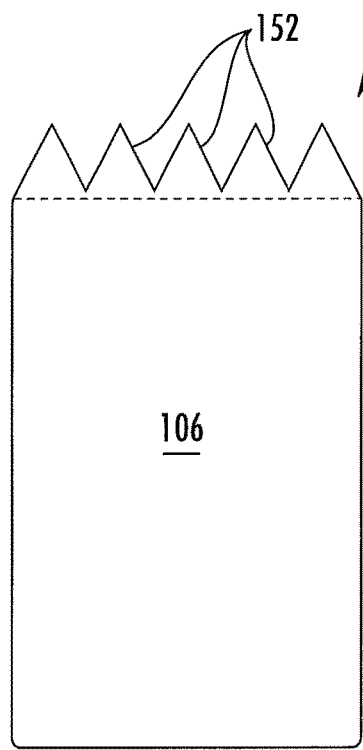
FIG. 7 is a plan view of another template or pattern for cutting material to fabricate a protective cover, according to still another example of the disclosure.
Figure 8:
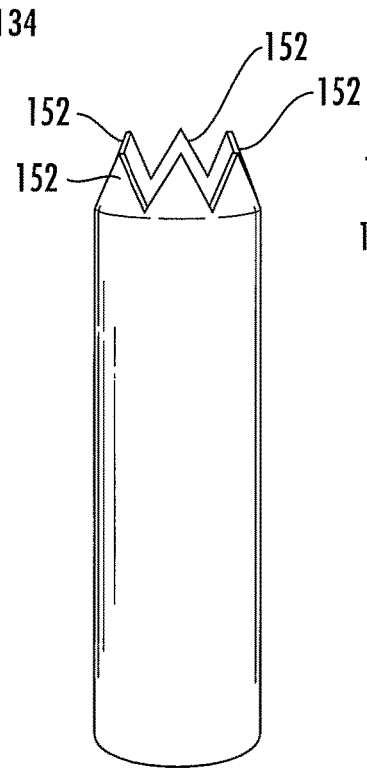
FIG. 8 is a perspective view showing a progressive stage of forming a protective cover cut from material according to the pattern of FIG. 7.
Figure 9:
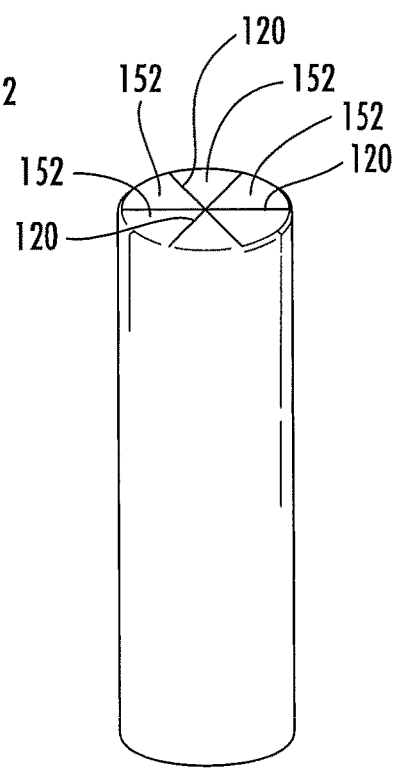
FIG. 9 is a perspective view of a further stage of forming a protective cover using the pattern of FIG. 7.
Figure 10:
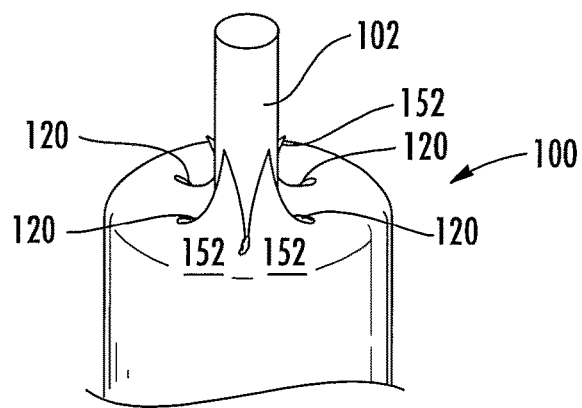
FIG. 10 is a perspective detail view of the top of the protective cover of FIG. 9, showing protrusion of a cable through the protective cover.

Turning now to FIGS. 7-10, in an example of the method, forming the section of the foil-backed substrate into end section 140 comprises forming pattern 134 into tube 138 corresponding to the final diameter and of length greater than the final length, cutting pointed teeth 152 into one end of tube 138 (or into pattern 134), and leaving an uncut portion (seen as tubular wall 106 in FIG. 7) equal in length to the final length of protective cover 100. The method further comprises folding pointed teeth 152 together such that slits 120 are between adjacent teeth 152, and bonding pointed teeth 152 together along a portion of each one of slits 120. FIG. 7 shows a pattern into which the section of the foil-backed fiberglass substrate and material for inner lining 126 may be cut. FIG. 8 shows the cut material forming tube 138. FIG. 9 shows teeth 152 folded to occupy a plane perpendicular to longitudinal axis 130 (FIG. 2). FIG. 10 shows slits 120 bonded along a portion of each slit 120, with the bond shown exaggerated for clarity. Bonding may be performed by heat sealing. Slits 120 are bonded along only a portion of each slit 120 to enable the innermost portion of each tooth 152 to deflect as shown in FIG. 10 when a cable 102, which could be jacketed, is pushed past teeth 152. In this example, there is no separate or discrete cap member such as cap member 116. Rather, the folded teeth 152 form end section 140. Also, an implementation of the present disclosure may include heating a circumference of the tube after the teeth have been folded to substantially join at least two of the teeth 152 together, and more specifically may include, heating the outside top corner circumference of tube 138 after teeth 152 have been folded to form a generally rigid end section 140.

In an example of the method, cutting central opening 118 into end section 140 comprises cutting radiating slits 120 into end section 140. Cutting the opening 118 into the end section can also comprise cutting at least one hole (e.g., 308, FIG. 11A) into the end section Slits 120 may be used exclusively to form central opening 118, as shown in FIGS. 7-10, may supplement a hole 154 punched or otherwise formed in cap member 116 (as in the example of FIG. 1), or may be entirely replaced by hole 154 (as in the example of FIG. 2). Hole 154 easily passes jacketed cable 102. Use of hole 154 in the absence of slits 120 tends to keep cap member 116 closed snugly, thereby obstructing ready entry of heat to internal volume 114.

In another example, and as seen in FIG. 2, the method further comprises locating central opening 118 in alignment with central longitudinal axis 130 of protective cover 100. This generally centers cable(s) 102 and connector(s) 104 within protective cover 100, thereby minimizing chafing of protective cover 100.

In a further example of the method, forming pattern 134 in tube 138 corresponding to the final length and the final diameter comprises lining pattern 134 on an interior surface thereof with inner lining 126.

In yet another example of the method, forming the section of the foil-backed fiberglass substrate into end section 140 comprises lining end section 140 on an interior surface with inner lining 126. Where end section 140 comprises cap member 116, a diameter of inner soft lining 126 will be less than an inner diameter of tube 138, so that inner soft lining 126 easily enters internal volume 114 and fits in close cooperation with surrounding tube 138. This is shown in FIG. 2.

Referring to the pattern shown in FIG. 5, in another example of the method, cutting pattern 134 from the section of the foil-backed fiberglass substrate and forming the section of the foil-backed fiberglass substrate into end section 140 comprise cutting pattern 134 and end section 140 from the section of the foil-backed fiberglass as a single piece.

In still another example of the method, cutting pattern 134 and end section 140 from the section of the foil-backed fiberglass as a single piece comprises die cutting pattern 134 and end section 140 from the section of the foil-backed fiberglass substrate as a single piece. Die cutting can potentially result in very accurate reproduction of desired shapes and contours from laminated strata such as the foil-backed fiberglass substrate and felt material constituting inner soft lining 126.

In a non-limiting example implementation reflecting an actual automotive application, protective cover 100 may be fabricated using the following dimensions. The foil-backed fiberglass substrate may be cut into strips of width of approximately 51 millimeters. The felt may be approximately 2.5 millimeters thick, and be cut into strips of width of approximately 38 millimeters. The felt may be wound to the form of tube 138 with a butt lap, tube 138 having an approximately 25 millimeter internal diameter. As the foil-backed fiberglass substrate is wound to form tube 138, lapping portion 136 may extend along a circumference of tube 138 by approximately 12-13 millimeters. A protective cover 100 will result which will accommodate in close cooperation therewith a component 104 of 25 millimeter diameter.

Turning now to FIGS. 11A-18C, additional exemplary embodiments of protective covers, or "covers," are shown in detail, which may be produced according to the methods described hereinabove. Such protective covers are configured to physically cover and/or thermally, mechanically, and/or electrically protect cables (i.e., 102, FIG. 2, including but not limited to electrical cables, optical cables, tension cables, etc.) and/or connectors, sensors, or other components (i.e., 104, FIG. 2) that are associated with such cables.

Each cover illustrated in FIGS. 11A-18C can comprise respective walls and/or cap members that are formed and/or fabricated from a multi-layered material including at least one layer of a metallic foil (e.g., 122, FIG. 2), at least one layer of a flexible insulating material (e.g., 124, FIG. 2), and at least one layer of a non-abrasive, soft lining material (e.g., 126, FIG. 2) as described hereinabove. In an exemplary embodiment, the metallic foil forms an outermost layer of each protective cover, and the insulating material forms an intermediate layer of each cover that contacts both the metallic foil and the soft lining material so that the soft lining material will face the internal volume of the protected covers described herein. The multi-layered material can be shaped (e.g., cut), laminated to an adhesive, rolled, and bonded (e.g., via the adhesive) to form the protective covers described herein. In certain embodiments, the protective covers illustrated in FIGS. 11A-18C can be formed via providing a prefabricated section of a metallic foil-backed fiberglass substrate, lining the prefabricated section with felt, laminating the prefabricated section to an adhesive, and rolling the substrate to bond portions of the substrate as described hereinabove.

Referring now to FIGS. 11A-11C and according to a further aspect of the disclosure, there is shown a protective cover 300 for protecting a cable (e.g., 102, FIG. 2) and/or connectors, sensors, or other components (e.g., 102, FIG. 2) associated therewith. Protective cover 300 can comprise a substantially tubular body, structure, or wall 302 that defines and/or forms an internal volume 304 between a first proximal end $E_1$ and a second distal end $E_2$. For illustration purposes only, wall 302 is illustrated as being substantially cylindrical in shape and having a substantially circular cross-section; however, other shapes and/or cross-sections (e.g., non-cylindrical bodies having non-circular sectional shapes) may be provided, where desired, without departing from the instant disclosure.

A cover, or cap member 306 at least partially covers the distal end $E_2$ of tubular wall 302. Cap member 306 can include an opening 308 and a plurality of slits 314A, 314B formed therein. In some embodiments, the plurality of slits 314A, 314B radiate outwardly from opening 308. A ratio between the thickness of opening 308 and the thickness of each slit 314A, 314B (i.e., the ratio of opening thickness/slit thickness) is between about 2 and 30. Cap member 306 can comprise a first, front planar surface 306A that opposes a second, rear planar surface 306B, such surfaces being planar when not acted on by external forces and/or components (e.g., cables, connectors, etc.). Opening 308 can, in some embodiments, be centrally disposed over front planar surface 306A of protective cover 300, and aligned with the centerline $C_L$ of cover 300. Further, opening 308 and the plurality of slits 314A, 314B can collectively form a symmetric shape or an asymmetric shape about a central axis defined by centerline $C_L$, the shape being disposed over the planar surfaces of cover 300 as seen in the plan view of distal end $E_2$ illustrated in FIG. 11B and the plan view of proximal end E1 illustrated in FIG. 11C. For example and in certain embodiments, cover 300 comprises a substantially square or rectangular opening 308 having slits 314, 314B extending therefrom to form a symmetric shape about the central axis defined by center centerline $C_L$.

Referring to FIGS. 11A and 11B, opening 308 and slits 314A, 314B can separate the front planar surface 306A into a plurality of different portions, for example, at least a first portion 310 and a second portion 312. Each portion (i.e., 310, 312) can flex and/or move closer or further apart when a cable, connector, or other component is pushed therethrough (see e.g., FIG. 10). For example, as a cable or component is pushed through cover 300, first and second portions 310, 312 can flex inwardly or outwardly in a direction that is substantially parallel to centerline $C_L$. A gap 318 is provided proximate the terminal ends of each of the plurality of slits 314A, 314B for preventing the slits from extending the full diameter of cap member 306. Each gap 318 allows the respective first and second portions 310, 312 of cover 300 to adequately open/close via moving or flexing relative to the centerline $C_L$ (e.g., moving or flexing in a direction $Z_1$) while reducing the potential for ripping and/or tearing the cap member 306 from the wall 302.

As noted above, protective cover 300 can be formed from a prefabricated section of a foil-backed fiberglass substrate that is bonded (e.g., laminated) to a pressure sensitive adhesive. The laminated structure can be formed into tubular wall 302 via rolling and bonding sections of the foil-backed fiberglass substrate together via the adhesive. A visible seam 316 oriented at an acute angle with respect to the centerline $C_L$ results from helically winding of the substrate to form wall 302. Cap member 306 can be formed from the same foil-backed fiberglass substrate as wall 302, and folded/bonded thereto as described above (see also, e.g., FIGS. 5, 6).

FIG. 11C illustrates a plan view of proximal end $E_1$ of protective cover 300, as viewed when looking towards an empty interior volume 304. Interior volume 304 is configured to cover, house, contact, encase and/or enclose a cable, connector, or related component(s). Cover 300 can comprise a wall thickness "t" of at least about 1 millimeter (mm) at least about 2 mm, at least about 3 mm or from about 1 mm to 10 mm, or any subrange thereof (e.g., 1-5 mm, 1-3 mm, 2-5 mm, 2-10 mm, etc.).

Outer wall 302 forms and/or comprises an outer diameter $D_O$ and an inner wall 320 forms and/or comprises an inner diameter $D_I$. In certain embodiments, outer diameter $D_O$ measures from about 5 to 50 mm, or any subrange thereof (e.g., 5-25 mm, 20-25 mm, 10-40 mm, etc.), whereas inner diameter $D_I$ measures from about 2 to 48 mm, or any subrange thereof (e.g., 2-20 mm, 20-30 mm, 15-35 mm, etc.). In certain embodiments, cover 300 is configured to cover and protect an automotive component having a diameter of about 25 mm; however, persons having skill in the art will appreciate that the size of protective cover 300 can be scaled up/down for covering and/or protecting respective larger/smaller components, where desired.

Referring now to FIGS. 12A-12C, a protective cover, generally 400, is provided for covering cables, connectors, and/or components for various applications. Protective cover 400 comprises a tube 402 that is open at a proximal end $E_1$ and substantially closed at the opposing, distal end $E_2$ by an end cap 406. End cap 406 comprises an opening 408 and at least one groove (e.g., 414A) extending therefrom that allows a first cap portion 410 to move and/or flex relative to a second cap portion 412 when a connector or cable breaches opening 408, or portions thereof. Tube 402 can form via overlappingly rolling and bonding a prefabricated section of a foil-backed fiberglass, thus forming an angled seam 416. Protective cover 400 can comprise a wall thickness "t" that defines the interior volume 404 of tube 402. Protective cover 400 can be sized and/or shaped for enclosing and thermally protecting cables for the automotive, aerospace, marine, commercial, construction, and/or medical sectors.

Cap member 406 can comprise a front planar surface 406A that opposes a rear planar surface 406B, such surfaces being planar when not acted on by external forces and/or components (e.g., cables, connectors, etc.). Notably, the one or more grooves 414A and 414B radiating outwardly from opening 408 do not fully penetrate the entire width or thickness of cover 400, and as such are not visible from the rear plan view in FIG. 11C. Thus, cap member 406 can comprise one or more discrete openings or holes (e.g., 408) and be devoid of radially extending slits, where desired. In certain embodiments, the discrete opening 408 is a square, a circle, or any non-square, non-circular shape desired. Opening 408 can comprise a hole width or diameter that is from about 0.01 to 3 mm. However, persons having skill will appreciate that a larger or smaller hole can be provided, where desired. More than one opening 408 can also be disposed in cap 406, where desired.

FIGS. 11A-18C illustrate numerous embodiments of protective covers having different sizes, shapes, and/or configurations of openings formed via one or more slits, holes, and/or combinations thereof. That is, the protective covers set forth herein include openings formed only of holes, slits, or combinations of holes and slits in various sizes, shapes, patterns, or designs for accommodating different components and/or different applications for multiple different industry sectors.

Referring now to FIGS. 13A-13C a protective cover, generally 500, is provided for covering cables, connectors, and/or components for various applications. Protective cover 500 comprises a tube 502 defining an interior volume 504 at a proximal end $E_1$ that is partially closed at the distal end $E_2$ by an end cap 506. End cap 506 comprises an opening formed by an open hole 508 and is devoid of narrow slits. Hole 508 is disposed between opposing walls 514A, 514B in cap 506, thereby forming a first non-planar surface 510 and a second non-planar surface 512, where each non-planar surface extends vertically above tube 502 along centerline $C_L$. Each non-planer surface (i.e., 510, 512) includes a non-planar front face 506A and a non-planar rear face 506B. Hole 508 allows each non-planar surface 510, 512 to independently move and/or flex as a connector or cable breaches hole 508, or a portion thereof. Tube 502 can form via overlappingly rolling and bonding a prefabricated section of a foil-backed fiberglass, thus forming an angled seam 516.

Protective cover 500 can be sized and/or shaped for enclosing and thermally protecting cables for the automotive, aerospace, marine, commercial, construction, and/or medical sectors. Notably, hole 508 is wider proximate the centerline $C_L$ of cap 506 and narrower proximate the edges of cap 506, which renders it suitable for accommodating larger (e.g., wider, thicker, etc.) cables, ribbons, connectors, components, and/or components for different industry sectors. In certain embodiments, hole 508 comprises a variable (non-uniform) width, which, at the widest portion measures from about 0.5 to 1.5 mm, and at the narrowest portion measures from about 0.01 to 0.25 mm Referring now to FIGS. 14A-14C a protective cover, generally 600, is provided. Protective cover 600 comprises a tube 602 defining an interior volume 604 at a proximal end $E_1$ that is partially closed at the distal end $E_2$ by an end cap 606. End cap 606 comprises a front planar surface 606A, an opposite rear planar surface 606B, and an opening formed by a slit 608. Notably, the slit 608 has a uniform width and is devoid of wider/narrower openings formed in portions thereof. Slit 608 can comprise a width that measures from about 0.01 to 1.8 mm, or any subrange thereof (e.g., 0.5-1 mm, 0.25-1.25 mm, 0.5-1.5 mm, etc.). Slit 608 allows at least a first cap portion 610 and a second cap portion 612 to independently move or flex in response to a connector or cable passing therethrough. Tube 602 can be formed via rolling, which forms a laterally disposed seam 616 therein.

Slit 608 can comprise a uniform (non-variable) width that measures between about 0.01-1.8 mm. Tube 602 can comprise an inner surface 618 facing the inner volume 604 for protecting and/or conforming to portions of a cable or component disposed therein (not shown). Protective cover 600 can comprise a wall thickness t from about 0.1 to 5 mm, which can be scaled up/down, where desired.

FIGS. 15A-15C are similar to the embodiment described and shown in FIGS. 14A-14C, but with a wider opening 708. FIGS. 15A-15C illustrate a protective cover, generally 700. Protective cover 700 comprises a tube 702 defining an interior volume 704 at a proximal end $E_1$ that is partially closed at the distal end $E_2$ by an end cap 706. End cap 706 comprises a front planar surface 706A, an opposite rear planar surface 706B, and opening 708 formed therein.

Notably, opening 708 has a uniform width 714 defined by opposing opening walls 714A and 714B, and is devoid of wider/narrower openings or slits formed therein. Opening 708 can comprise a width from about 0.05 to 2 mm, or any subrange thereof (e.g., 0.5-1 mm, 0.05-1.25 mm, 0.5-1.5 mm, etc.). Opening 708 allows at least a first cap portion 710 and a second cap portion 712 to independently move or flex in response to a connector or cable passing therethrough. Tube 602 can be formed via rolling, which forms a laterally disposed seam 716 therein.

Opening 708 can comprise a uniform (non-variable) width that measures between about 0.05-2 mm Tube 702 can comprise an inner surface 718 facing the inner volume 704 for protecting and/or conforming to portions of a cable or component disposed therein (not shown). Protective cover 700 can comprise a thickness t from 0.1 to 5 mm, which can be scaled up/down, where desired.

According to a further aspect, FIGS. 16A-16C illustrate a protective cover, generally 800. Protective cover 800 comprises a tube 802 defining an interior volume 804 at a proximal end $E_1$ that is partially closed at the distal end $E_2$ by an end cap 806. End cap 806 comprises a front planar surface 806A, an opposite rear planar surface 806B, and an opening formed therein. The opening is formed by at least one hole 808 and a plurality of slits 810A, 810B, and 810C. Slits 810A, 810B, and 810C can radiate from and/or extend around portions of hole 808. The plurality of slits 810A, 810B, and 810C can also form a single continuous slit that curves around portions of hole 808, for example, and forms a semi-circle around hole 808. Notably, the opening in end cap 806 is symmetrical about the center axis defined by and/or disposed along centerline $C_L$ and non-symmetrical about at least one other axis, such as a transverse axis $A_B$ that bisects cover 800 in the plan view shown in FIG. 16B. Hole 808 can comprise a width or diameter that measures from about 0.1 to 2 mm, or any subrange thereof (e.g., 0.1-0.5 mm, 0.5-1.25 mm, 0.5-1.5 mm, etc.). Slits 810B and 810C form a semicircle proximate an edge of perimeter of end cap 806, allowing at least a first cap portion 812 and a second cap portion 814 to independently move or flex in response to a connector or cable passing therethrough. An outermost border region 816 of end cap 806 may remain stationary as portions 812 and 814 flex and/or move relative thereto. Tube 802 can be formed via rolling, which forms an external seam 818.

FIGS. 17A-17C illustrate a protective cover, generally 900 having an asymmetrical opening 908 formed therein. For example, opening 908 is asymmetrical about a center axis defined by and/or disposed along centerline $C_L$. Protective cover 900 comprises a tube 902 defining an interior volume 904 at a proximal end $E_1$ that is partially closed at the distal end $E_2$ by an end cap 906. End cap 906 comprises a front planar surface 906A, an opposite rear planar surface 906B, and opening 908 formed therein. The opening is formed by a curved, sinusoidal shaped slit that allows at least a first cap portion 910 and a second cap portion 912 to independently move or flex in response to a connector or cable passing therethrough. Tube 902 can be formed via rolling, which forms an external seam 914.

Tube 902 can comprise an inner surface 916 facing the inner volume 904 for protecting and/or conforming to portions of a cable or component disposed therein (not shown). Protective cover 900 can comprise a wall thickness t that measures from about 0.1 to 5 mm, which can be scaled up/down, where desired.

Figure 18A:
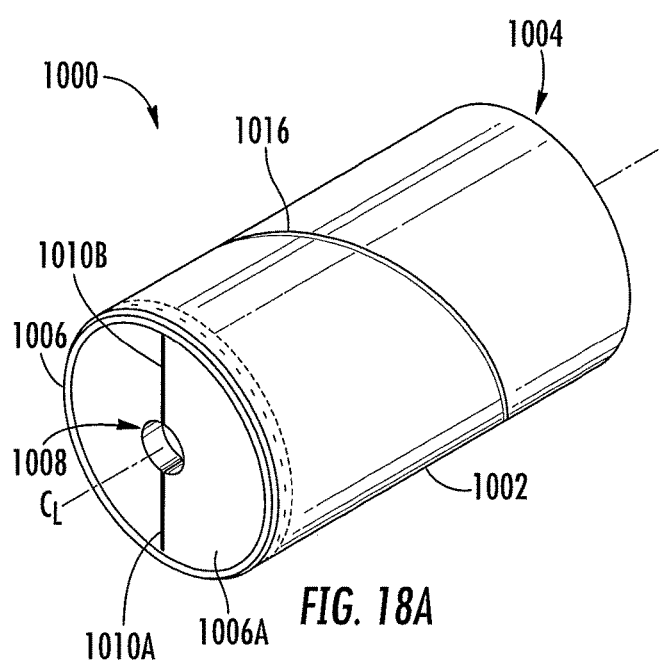
FIGS. 18A-18C are respective perspective, front plan, and rear plan detail views of a protective cover, according to yet another example of the disclosure.
Figure 18B:
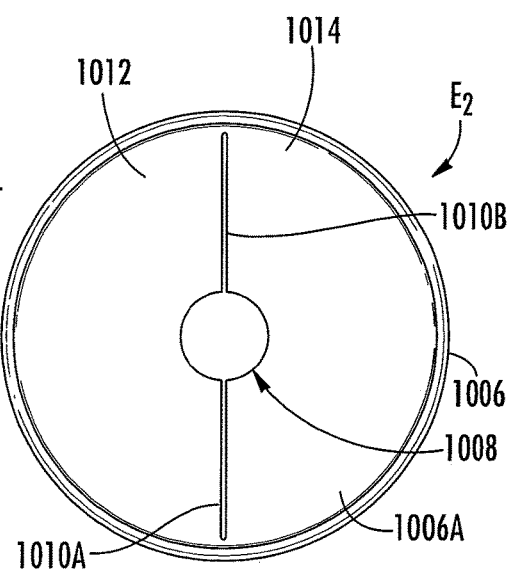
Figure 18C:
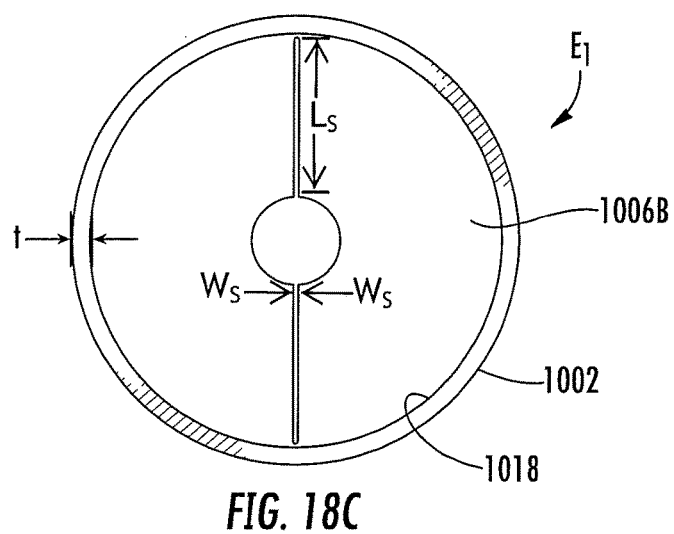

In a further embodiment, FIGS. 18A-18C illustrate a protective cover, generally 1000. Protective cover 1000 comprises a tube 1002 defining an interior volume 1004 that is open at proximal end $E_1$ and at least partially closed at the opposed distal end $E_2$ by an end cap 1006. End cap 1006 includes a first surface 1006A, an opposing second surface 1006B, and bears an opening formed by an open hole 1008 and a plurality of slits 1010A, 1010B. The plurality of slits 1010A, 1010B radially extend from open hole 1008, and on directly opposing sides of open hole 1008. The opening allows at least a first cap portion 1012 and a second cap portion 1014 to flex and/or move in response to a cable or connector (not shown) passing therethrough. Protective cover 1000 can be made by overlappingly rolling and bonding a section of foil-backed fiberglass forming a seam 1016. As used herein, the term "slit" refers to a long and/or thin opening that has a length to width ratio (i.e., the ratio of slit length $L_S$/slit width $W_S$, see e.g., FIG. 18C) from about 5 to 100.

The opening in cover 1000 comprises a hole 1008 having a diameter from about 0.1 to 2 mm, or any subrange thereof (e.g., 0.2-2 mm, 0.5-1.5 mm, 1-2 mm, etc.). The slits 1010A, 1010B can comprise a width of about 0.01-0.5 mm, or a subrange thereof. The opening can be scaled up/down in size depending upon the size of the component to be housed inside protective cover 1000.

FIGS. 11A-18C illustrate numerous embodiments of protective covers having different sizes, shapes, and/or configurations of openings formed in the distal end thereof. The protective covers set forth herein are configured to accommodate components having different size(s) and/or shape(s) for use in different applications across different industry sectors.

In the foregoing description, numerous specific details are set forth in order to provide an understanding of the present invention. It will be apparent, however, to one skilled in the art that the present invention may be practiced without these specific details. Thus, the specific details set forth are merely exemplary. The specific details may be varied from and still be contemplated to be within the scope of the present invention. Although specific terms are employed herein, they are used in a generic and descriptive sense only and not for purposes of limitation.

While the disclosed concepts have been described in connection with what is considered the most practical and preferred implementation, it is to be understood that the disclosed concepts are not to be limited to the disclosed arrangements, but are intended to cover various arrangements which are included within the scope of the broadest possible interpretation of the appended claims so as to encompass all modifications and equivalent arrangements which are possible.

Therefore, it should be understood that the various examples of the apparatus(es) disclosed herein may include any of the components, features, and functionalities of any of the other examples of the apparatus(es) disclosed herein in any feasible combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

What is claimed is:

1. A protective cover for protecting a component of a cable, the protective cover comprising:
    a tubular portion defining an internal volume adapted to receive the component;
    the tubular portion defining an outer diameter, a proximal end, and a distal end;
    a separate cap member fixedly attached to and substantially covering the distal end of the tubular portion, the cap member having at least one rectangular opening centrally formed therein and defining a first end and a second end opposite the first end;
    a first slit radiating away from the first end of the rectangular opening;
    a second slit radiating away from the second end of the rectangular opening; and
    the tubular portion and the cap member each including:
        an outer surface comprising metallic foil;
        an inner surface adjacent the internal volume comprising a material generally non-marring to the cable; and
    a central portion between the outer surface and the inner surface comprising a flexible insulating material.

2. The protective cover of claim 1, wherein:
    the cap member includes a skirt portion folded against and bonded to the outer surface of the tubular portion.

3. The protective cover of claim 1, wherein:
    the tubular portion is generally cylindrical and has a central longitudinal axis parallel to the tubular portion; and
    the cap member is generally circular and is generally perpendicular to the central longitudinal axis.

4. The protective cover of claim 1, wherein the flexible insulating material primarily comprises fiberglass.

5. The protective cover of claim 1, wherein the metallic foil primarily comprises aluminum.

6. The protective cover of claim 1, wherein the inner surface comprises primarily felt.

7. The protective cover of claim 1, wherein the tubular portion defines a central longitudinal axis generally parallel to the tubular portion and wherein the opening in the cap member forms a shape that is asymmetrical to the central longitudinal axis.

8. The protective cover of claim 1, wherein the tubular portion is generally cylindrical and defines a central longitudinal axis generally parallel to the tubular portion and wherein the opening in the cap member forms a shape that is symmetrical to the central longitudinal axis.

* * * * *